US010404646B2

(12) United States Patent
Balasaygun et al.

(10) Patent No.: US 10,404,646 B2
(45) Date of Patent: Sep. 3, 2019

(54) INTEGRATION OF REAL-TIME AND NON-REAL-TIME COMMUNICATIONS

(71) Applicant: Avaya Inc., Santa Clara, CA (US)

(72) Inventors: Mehmet Balasaygun, Freehold, NJ (US); Rajeshwari Edamadaka, Allentown, NJ (US); Jonathan Mark Silverman, Minneapolis, MN (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 278 days.

(21) Appl. No.: 15/006,293

(22) Filed: Jan. 26, 2016

(65) Prior Publication Data

US 2017/0214650 A1 Jul. 27, 2017

(51) Int. Cl.
*H04L 12/58* (2006.01)
*H04L 29/06* (2006.01)

(52) U.S. Cl.
CPC .......... *H04L 51/36* (2013.01); *H04L 65/4007* (2013.01); *H04L 51/00* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 7,685,235 B2 | 3/2010 | Curran et al. | |
| 7,903,796 B1 | 3/2011 | Kheradpir et al. | |
| 8,683,351 B2 | 3/2014 | Cheng et al. | |
| 8,700,012 B2* | 4/2014 | Ferren | G02B 13/0065 455/414.1 |
| 2004/0205574 A1* | 10/2004 | Sayers | G06F 17/2247 715/236 |
| 2005/0235034 A1* | 10/2005 | Chen et al. | H04L 12/1831 709/206 |
| 2009/0049138 A1 | 2/2009 | Jones et al. | |
| 2010/0011373 A1* | 1/2010 | Youel | G06Q 10/107 719/313 |
| 2010/0172483 A1* | 7/2010 | Weiner | H04M 3/533 379/211.02 |

(Continued)

FOREIGN PATENT DOCUMENTS

WO  WO 2014/043165  3/2014

*Primary Examiner* — Viet D Vu
*Assistant Examiner* — James A Edwards
(74) *Attorney, Agent, or Firm* — Sheridan Ross P.C.

(57) ABSTRACT

First communication information is received from a first communication session in a first communication medium. The first information has an associated first topic identifier. The first communication information may be a media stream, such as a voice media stream. Second communication information is received from a second communication session in a second communication medium associated with the first topic identifier. The first and second communication mediums are different communication mediums. The second communication session occurs after the first communication session has ended. For example, the second communication medium may be an email that occurs after a voice call has completed. The first information and the second information are stored in a first topic record based on the first topic identifier. A user can then access the topic record to view the first and second communication information for the topic.

20 Claims, 8 Drawing Sheets

(56) References Cited

U.S. PATENT DOCUMENTS

| | | | |
|---|---|---|---|
| 2011/0200181 A1* | 8/2011 | Issa | G06Q 10/10 |
| | | | 379/93.01 |
| 2012/0023407 A1* | 1/2012 | Taylor | 715/731 |
| 2012/0079099 A1* | 3/2012 | Dhara | G06Q 10/107 |
| | | | 709/224 |
| 2012/0164998 A1 | 6/2012 | Mousseau et al. | |
| 2012/0276932 A1* | 11/2012 | Ferren | G02B 13/0065 |
| | | | 455/456.6 |
| 2014/0022572 A1* | 1/2014 | Washington | G06F 17/30265 |
| | | | 358/1.13 |
| 2016/0150041 A1* | 5/2016 | Bolinger | H04L 67/2804 |
| | | | 706/12 |
| 2016/0378734 A1* | 12/2016 | Mullins | G06F 3/04845 |
| | | | 715/229 |

\* cited by examiner

INTEGRATION OF REAL-TIME AND NON-REAL-TIME COMMUNICATIONS

TECHNICAL FIELD

The systems and methods disclosed herein relate to communication systems and in particular to integration of disparate communication systems.

BACKGROUND

Today, people can communicate using various communication media (or mediums), such as, voice, video, email, Instant Messaging (IM), text messaging, social media, and the like. However, many of the systems that support different communication media are disparate systems. For example, communications that are made by voice are controlled and managed separately from email communications and social media communications. Integration between these disparate systems has been limited. The lack of integration has made it difficult to tie together communications in different mediums that are related.

BRIEF SUMMARY

Systems and methods are provided that can manage communications associated with a topic. First communication information is received from a first communication session in a first communication medium. The first information has an associated first topic identifier. The first communication information may be a media stream, such as a voice media stream. Second communication information is received from a second communication session in a second communication medium associated with the first topic identifier. The first and second communication mediums are different communication mediums. The second communication session occurs after the first communication session has ended. For example, the second communication medium may be an email that occurs after a voice call has completed. The first and second information are stored in a first topic record based on the first topic identifier. A user can then access the topic record to view the first and second communication information for the topic.

DETAILED DESCRIPTION

Figure 1:
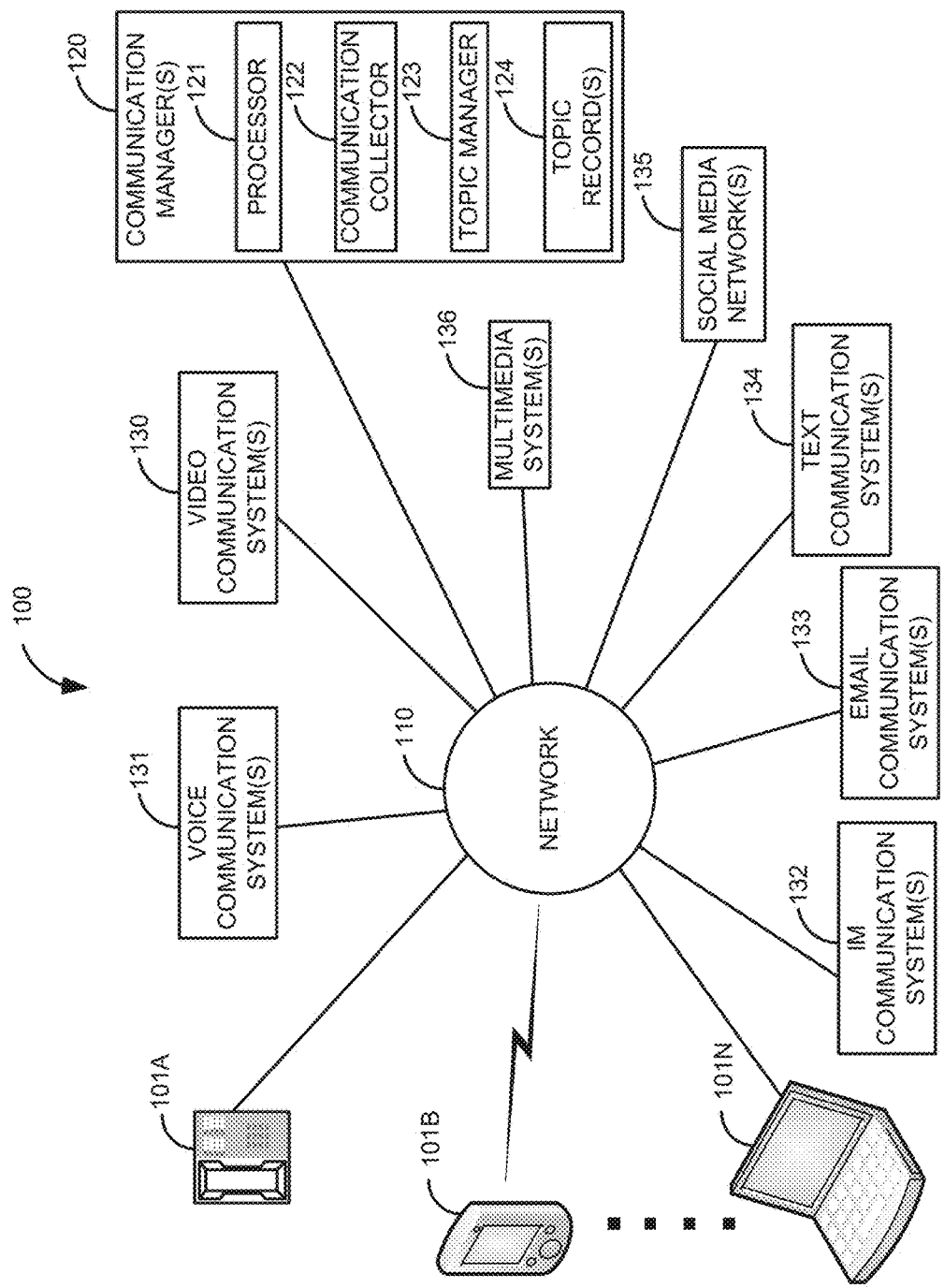
FIG. 1 is a block diagram of a first illustrative system for organizing communications related to a topic.

FIG. 1 is a block diagram of a first illustrative system 100 for organizing communications related to a topic. The first illustrative system 100 comprises communication endpoints 101A-101N, a network 110, a communication manager(s) 120, a video communication system(s) 130, a voice communication system(s) 131, an IM communication system(s) 132, an email communication system(s) 133, a text communication system(s) 134, a social media network(s) 135, and a multimedia system 136(s). In FIG. 1, the elements 130-136 are considered communication systems.

The communication endpoint 101 can be or may include any device that can communicate on the network 110, such as a Personal Computer (PC), a telephone, a video system, a cellular telephone, a Personal Digital Assistant (PDA), a tablet device, a notebook device, a smart phone, a web collaboration endpoint (e.g., a communication endpoint 101 that uses a browser to collaborate at a collaboration web site), and/or the like. As shown in FIG. 1, any number of communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, email protocols (e.g. Simple Message Service (SMS)), IM protocols, multimedia protocols, social media network protocols, text communication protocols, video protocols, and/or the like. Thus, the network 110 is an electronic communication network configured to carry messages via packets and/or circuit switched communications.

The communication manager 120 can be or may include any hardware coupled with software that can manage information for communications from different communication systems, such as a server, a Private Branch Exchange (PBX), a cloud system, a session manager, and/or the like. The communication manager 120 further comprises a processor 121, a communication collector 122, a topic manager 123, and topic record(s) 124.

The processor 121 can be or may include any hardware processor, such as a microprocessor, a microcontroller, a Digital Signaling Processor (DSP), an application specific processor, a multi-core processor, and/or the like.

The communication collector 122 can be or may include any hardware coupled with software that can collect and manage communications from different communication systems. For example, the communication collector 122 can collect information from the communication systems 130-136. In FIG. 1, the communication collector 122 is shown in the communication manager 120. However, in some embodiments, the communication collector 122 may be distributed between the communication manager 120 and the communication system 130-136.

The topic manager 123 can be or may include any hardware coupled with software that can manage communications based on a defined topic. In FIG. 1, the topic manager 123 is shown in the communication manager 120. However, in some embodiments, the topic manager 123 may be distributed between the communication manager 120 and the communication system 130-136.

The topic record(s) 124 are records of communication sessions and events associated with a topic. A topic might be for a project being managed in a company, a problem in a product, a manufactured product, a political event, a news event, a discussion on an event, a document, a presentation, a surveillance of a building, and/or the like. The topic record(s) 124 are records associated with conversations, communications, events associated with the topic, and/or the like.

The communication systems 130-136 comprise various types of communications systems. The communications systems 130-136 are shown as separate systems. However, in some embodiments, the communication system 130-136 may be in the same system and/or in the communication manager 120. For example, the video communication system 130 and the voice communication system 131 may be part of the communication manager 120. In one embodiment, the communication manager 120 is a single unified communication system with a sub system for voice, video, email, IM, text, web collaboration, and/or the like.

The video communication system(s) 130 can be or may include any hardware coupled with software that can manage video communications, such as a video server, a video switch, a video bridge, a PBX, a central office switch, and/or the like. The video communication system(s) 130 can manage video communications between some or all of the communication endpoints 101A-101N. The video communication system(s) 130 may also manage video communications between the communication device 101 and other devices, such as a video server, a video mail system, and/or the like.

The voice communication system(s) 131 can be or may include any hardware coupled with software that can manage voice communications, such as, a voice switch, a voice bridge, a PBX, a central office switch, and/or the like. The voice communication system(s) 131 can manage voice communications between some or all of the communication endpoints 101A-101N. The voice communication system(s) 131 can manage voice communications between the communication device 101 and other devices, such as a voice server (e.g., a music server), a voicemail system, and Interactive Voice Response (IVR) system, and/or the like.

The IM communication system(s) 132 can be or may include any hardware coupled with software that can manage IM communications, such as an IM server, an IM bridge, and/or the like. The IM communication system(s) 132 can manage IM communications between some or all of the communication endpoints 101A-101N. The IM communications may contain multi-media segments, such as attachments, pictures, and/or the like.

The email communication system(s) 133 can be or may include any hardware coupled with software that can manage email communications, such as an email server, an email system, and/or the like. The email communication system(s) 133 can manage email communications between some or all of the communication endpoints 101A-101N. The email communications may contain multi-media segments, such as attachments, pictures, and/or the like.

The text communication system(s) 134 can be or may include any hardware coupled with software that can manage text messages or chats, such as a text messaging server and/or the like. The text communication system(s) 134 can manage text communications between some or all of the communication endpoints 101A-101N. The text communications may contain multi-media segments, such as attachments, pictures, and/or the like.

The social media network(s) 135 can be or may include any hardware coupled with software that can provide social networking. For example, the social media network(s) 135 may be Facebook™, Linkedin™, Twitter™, and/or the like.

The social media network(s) 135 can manage social media communications between some or all of the communication endpoints 101A-101N.

The multimedia system(s) 136 can be or may include any hardware coupled with software that can manage multimedia communions. The multimedia system(s) 136 can manage multimedia communications between some or all of the communication endpoints 101A-101N. The multimedia system 136 may be a subsystem that enables sharing of documents and screens in real time in addition to a set of audio and video streams. The multimedia system 136 may be integrated with a conference bridge.

Figure 2:
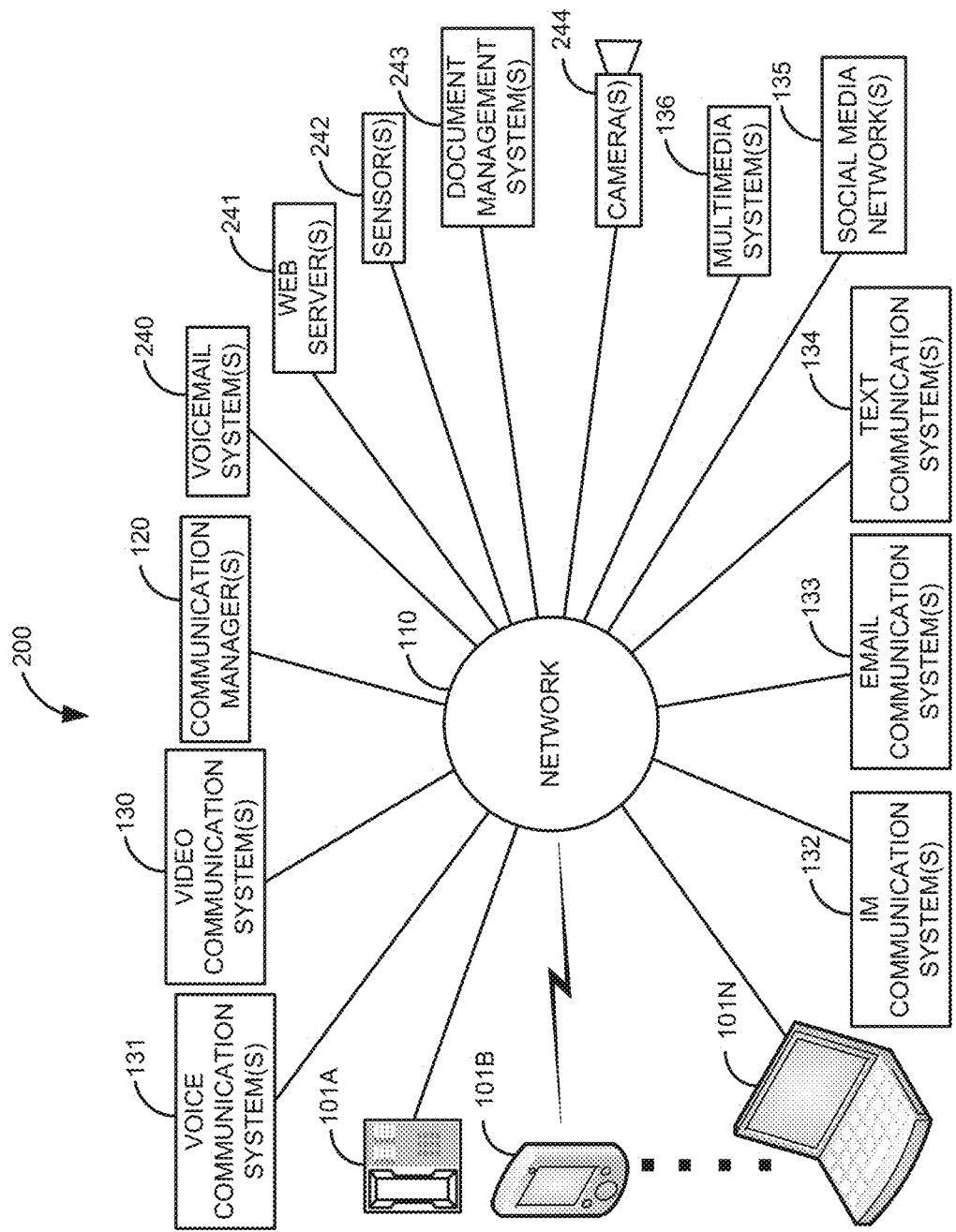
FIG. 2 is a block diagram of a second illustrative system for organizing communications related to a topic.

FIG. 2 is a block diagram of a second illustrative system 200 for organizing communications related to a topic. The second illustrative system 200 comprises the communication endpoints 101A-101N, the network 110, the communication manager(s) 120, the video communication system(s) 130, the voice communication system(s) 131, the IM communication system(s) 132, the email communication system(s) 133, the text communication system(s) 134, the social media network(s) 135, the a multimedia system 136(s), a voice mail system(s) 240, a web server(s) 241, a sensor(s) 242, a document management system(s) 243, and a camera(s) 244.

The voicemail system(s) 240 can be or may include any hardware coupled with software that can provide voicemail. The voicemail system(s) 240 can provide voicemail for some or all of the communication endpoints 101A-101N. The voicemail system may also provide video mail.

The web server(s) 241 can be or may include any hardware coupled with software that can provide content on the network 110. The web server(s) 241 can provide web pages to some or all of the communication endpoints 101A-101N.

The sensor(s) 242 may be any hardware sensor that can provide information to the communication manager 120, such as, a Radio Frequency Identification (RFID) scanner, a motion detector, a pressure sensor, a card reader, a barcode scanner, a security sensor, and/or the like.

The document management system(s) 243 may be any hardware system coupled with software that can manage documents, such as, a document repository, a document storage system, a disk farm, a document tracking system, and/or the like.

The camera(s) 244 can be any hardware device that can capture video images and/or video streams, such as, a security camera, a smart phone, a video conference room camera, a hand-held camera, a surveillance camera, and/or the like.

The second illustrative system 200 may comprise other elements (not shown), such as a FAX machine, a network scanner, a pager, a router, a switch, a network management system, a conference bridge, a conference recorder, a video conference recorder, and/or the like. The embodiments described in FIGS. 1-2 are two exemplary embodiments that may work with the process described in FIGS. 3-8. However, the embodiments described in FIGS. 1-2 are not limited by the disclosure discussed in FIGS. 3-8.

Figure 3:
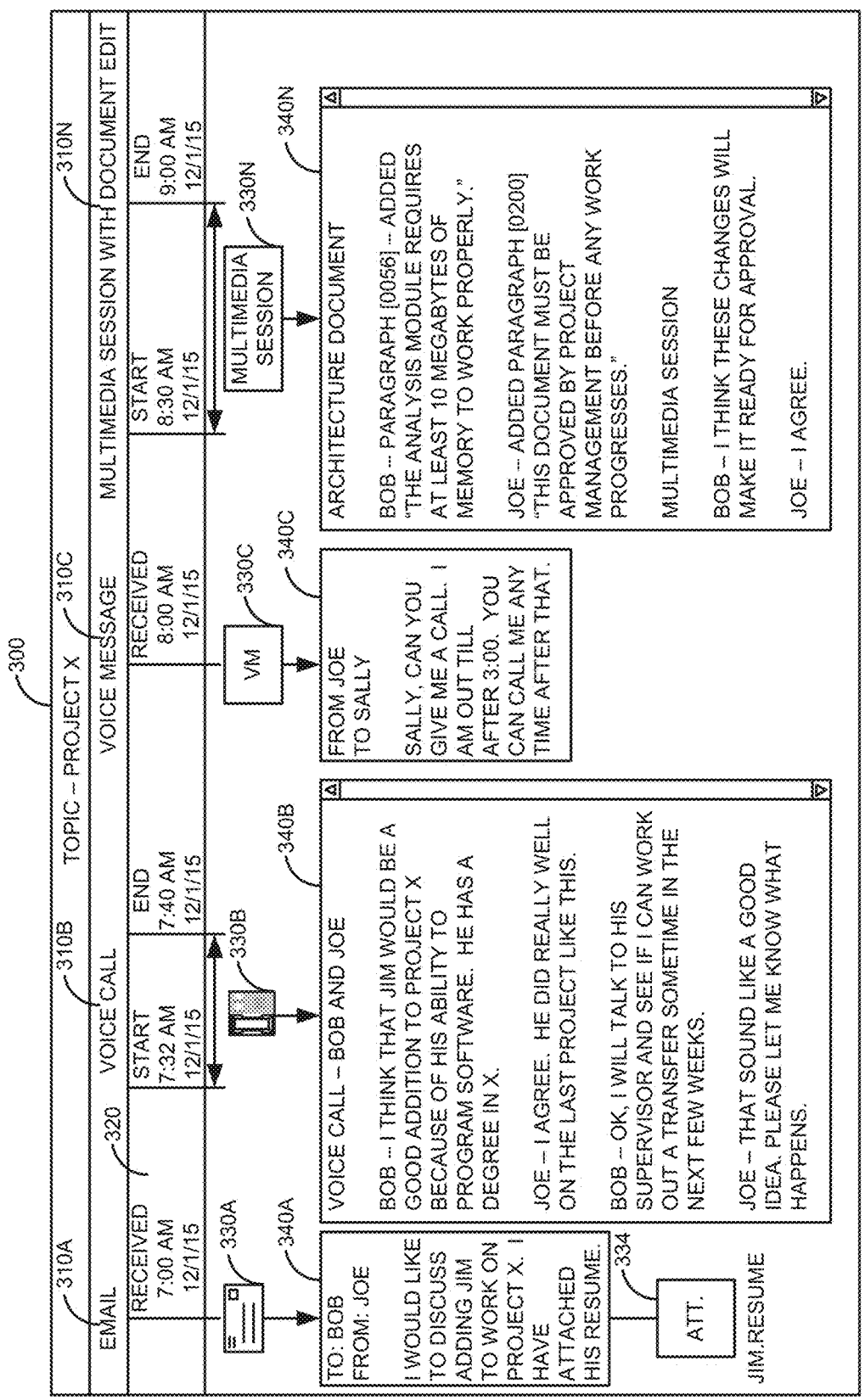
FIG. 3 is a diagram of a display of related communications in a topic record.

FIG. 3 is a diagram of a display of related communications in a topic record 124. FIG. 3 comprises a topic window 300. The topic window 300 is an exemplary embodiment of a display of a topic record 124. The topic window 300 comprises events 310A-310N, a timeline 320, event icons 330A-330N, event windows 340A-340N, and an attachment icon 334.

The timeline 320 is a timeline of events 310A-310N associated with a topic. In FIG. 3, the topic is for Project X. The timeline 320 comprises four events 310A-310N that are associated with project X. The timeline 320 for a topic record 124 may comprise any number of events 310A-310N. An event 310 may be a communication session, such as a video communication, a voice communication, an IM communication, an email communication, a text communication, a social media conversation, a multimedia communication, a voicemail communication, a recorded verbal conversation in a room, a web collaboration/presentation session, and/or the like.

The event 310 may be something that is associated with a topic, but is not a communication between two or more persons. For example, the event 310 may be a posting on a web server 241 of information associated with the topic, an access of a web server 241 containing information associated with the topic, accessing a document associated with the topic in the document management system 243, editing a document associated with a topic in the document management system 243, scanning a document associated with the topic (e.g., by detecting information on the project in the scanned document), receiving or sending a FAX associated with the topic, posting information on a social media network 135 about the topic, accessing information on a social media network 135 associated with the topic, and/or the like.

The event 310 may be associated with a sensor 242, such as an RFID scanner that detects who is in a room where the topic is discussed, a motion detector detecting someone in a secure room or area, a security camera 244 using facial recognition to determine who is discussing information associated with the topic, a security camera 244 providing surveillance information, a barcode scanner accessing a website associated with the topic, and/or the like.

In FIG. 3, the events 310A-310N comprise an email event 310A received at 7:00 AM on Dec. 1, 2015, a voice call event 310B that started at 7:32 AM and ended at 7:40 AM on Dec. 1, 2015, a voice message event 310C received at 8:00 AM on Dec. 1, 2015, and a multimedia session event 310N where a document was edited that started at 8:30 AM and ended at 9:00 AM on Dec. 1, 2015. Each event 310A-310N includes an event icon 330A-330N. The event icon 330A is for the email. The event icon 330B is for the voice call. The event icon 330C is for the voicemail. The event icon 330N is for the multimedia session with the document edit. The email event window 340A is for the email event. The voice call event window 340B is for the voice call event. The event window 340C is for the voicemail event. The multimedia event window 340N is for the multimedia session with the document edit.

In this embodiment, a user can select an event icon 330 to display communication information associated with the event 310 in the communication windows 340. In FIG. 3, the user has selected each of the event icons 330A-330N to display the communication information for the events 310A-310N in the event windows 340A-340N. In other embodiments, the event windows 340A-340N may be displayed automatically and there may not be any event icons 330.

In FIG. 3, each of the events 310A-310N is displayed in the event windows 340A-340N in text. However, in other embodiments, the events 310A-310N may be displayed in voice or video (depending on the type of event 310) when the user clicks on the events icons 330A-330N. For example, the voicemail event 310C may be played to the user instead of displayed in text. If the voice call event 310B was a video call, when the user clicks on the event icon 330B, the video stream of the video call may be displayed instead of a text transcription. How the events 310 are displayed may be configured by an administrator or by the user.

The email event window 340A comprises the content of the email. The email is from Bob to Joe and discusses adding Jim to work on Project X. The email also has an attachment 334 of Jim's resume'.

The voice call event window 340B comprises a voice-to-text transcription of the voice call. The call is between Bob and Joe.

The voicemail event window 340C comprises a voice to text transcription of the voicemail. The voicemail is from Joe to Sally.

The multimedia event window 340N is a transcript of the discussion that occurred during the multimedia communication session and edits to an architecture document associated with Project X. The architecture document was edited as part of the multimedia session. Bob edited paragraph [0056] of the architecture document for Project X. Joe added paragraph [0200] to the architecture document for Project X. Bob and Joe discussed the changes. In one embodiment, the edits are accomplished using voice that is then transcribed into the text edits. This way, users can interactively edit the document in the multimedia communication session using voice instead of text to edit the document.

Figure 4:
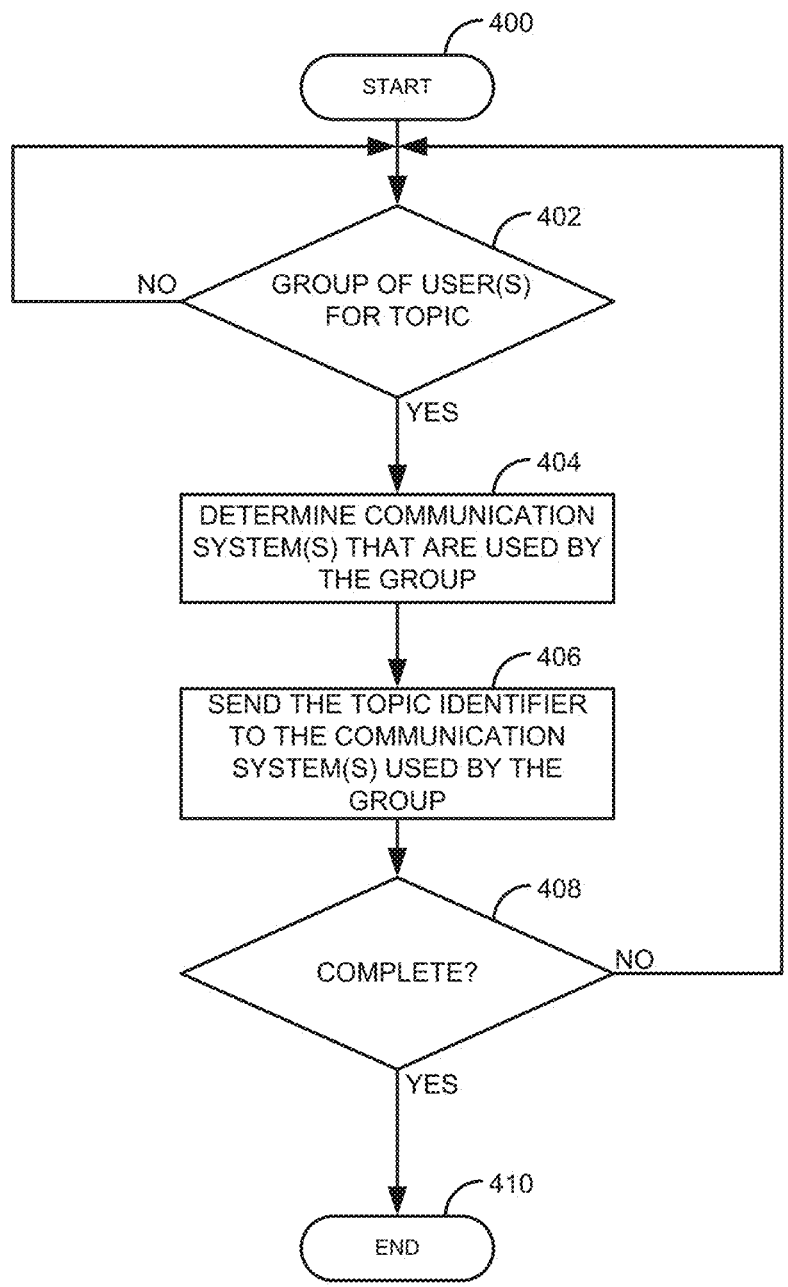
FIG. 4 is a flow diagram of a process for defining groups of users associated with a topic record.

FIG. 4 is a flow diagram of a process for defining groups of users associated with a topic record 124. Illustratively, the communication endpoints 101A-101N, the communication manager 120, the communication collector 122, the topic manager 123, the video communication system 130, the voice communication system 131, the IM communication system 132, the email communication system 133, the text communication system 134, the social media network 135, the multimedia system 136, the voicemail system 240, the web server 241, the sensor 242, the document management system 243, and the camera 244 are stored-program-controlled entities, such as a computer or processor 121, which performs the methods of FIGS. 4-8 and the processes described herein by executing program instructions stored in a computer readable storage medium, such as a memory or disk. Although the methods described in FIGS. 4-8 are shown in a specific order, one of skill in the art would recognize that the steps in FIGS. 4-8 may be implemented in different orders and/or be implemented in a multi-threaded environment. Moreover, various steps may be omitted or added based on implementation.

The process starts in step 400. The topic manager 123 determines in step 402 if a group of user(s) has been assigned to a topic. If a group of user(s) has not been defined in step 402, the process repeats step 402. A topic, such as, management of a project will have specific individuals associated with the project. For example, a group as described in FIG. 3 that comprises the users Bob, Joe, and Sally are assigned to Project X. A user, such as an administrator may access the topic manager 123 via one of the communication endpoints 101 to define members of a group for a project (topic). In one embodiment, a topic may be automatically created when a user creates a communication session with another person(s) who may or may not be a user of the same communication system.

Groups may be formed dynamically with users deciding who should be engaged and have access to communication sessions. A group of users may start with one or more participants and grow or shrink as the conversation remains active.

Once a group of user(s) for a topic is defined in step 402, the topic manager 123 determines the communication system(s) (e.g., communication systems 130-136) used by the individuals in the group in step 404. For example, Bob may have accounts on the voice communication system 131, the IM communication system 132, the multimedia system 136, the voicemail system 240, and the document management system 243. Joe may have accounts the voice communication system 131, the IM communication system 132, the multimedia system 136, the voicemail system 240, the document management system 243, and the social media network 135. Sally may use the same or different media channels.

In addition, step 404 may also determine communication devices (e.g., the communication devices 240-244) that may also play a role in gathering information for the topic. For example, a security camera 244 or sensor 242 may be defined to provide communication information for the topic. In an alternative embodiment, step 404 is not necessary and the topic identifier is sent to all communication systems that support topic identifiers in step 406. The topic manager 123 sends topic identifier (e.g., a unique number) to the communication systems/devices (130-136 and/or 240-244) that are associated with the one or more users in step 406.

The communication systems (130-136 and/or 240-244) receive the topic identifier. The communication systems (130-136 and/or 240-244) then provide methods of where a user can associate an event 310 to be associated with a topic record 124. For example, when a user makes a voice call, video call, and/or a multimedia call, the user may be asked to enter a topic ID or select a project. Alternatively, the user may not need to enter a topic ID/project. The system may provide a suggestion based on the content of a new communication later on once enough information is captured or when the communication session/segment has ended. For emails, IMs, or text messages, the user may select a topic from a dropdown menu. For sensors 242, the input from the sensor 242 (e.g., a user accessing a video conference room) may be tied to a communication session, such as a video communication that discusses the topic. For a scanner, the topic may be displayed to associate the scanned document with the topic.

For specific types of communication systems/devices, an administrator may define how an event 310 is captured. For example, a network address (e.g., an IP address or URL) of a web page, (e.g., a project web page), a web server 241, and/or social media network 135 may be defined to create an event 310 when the web page is accessed or a message is posted to the IP address (e.g., a Hyper Text Transport Protocol (HTTP) get or put). The sensors 242 or cameras 244 may be defined as part of a topic when they detect a type of event 310. Similarly, an event 310 using the topic ID may be generated when a user accesses a document associated with the topic.

If the process is complete in step 408, the process ends in step 410. Otherwise, the process goes back to step 402 to wait for a user/process to define a group of users for another topic.

Figure 5:
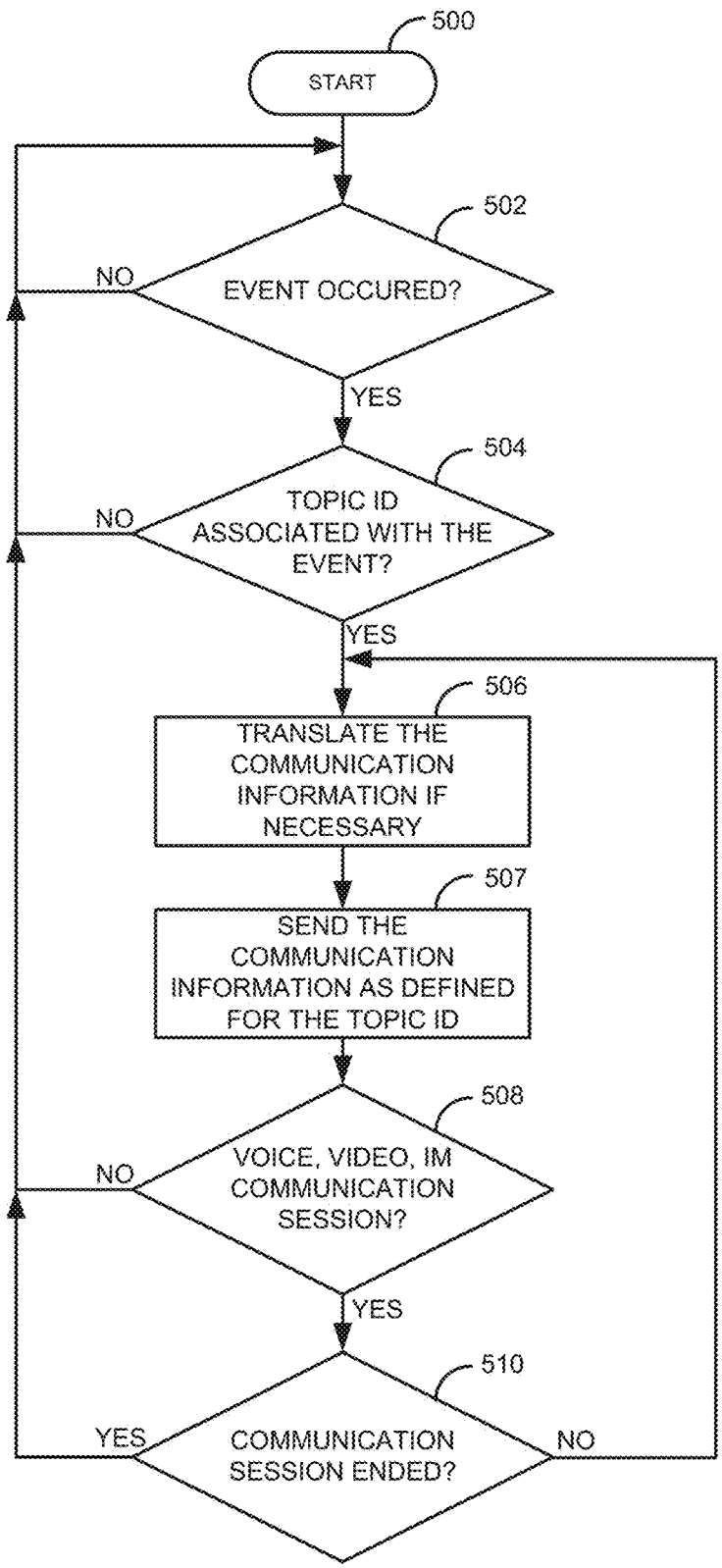
FIG. 5 is a flow diagram of a process for capturing events associated with a topic record.

FIG. 5 is a flow diagram of a process for capturing events 310 associated with a topic record 124. The process of FIG. 5 is from the perspective of the communication systems/devices (130-136 and/or 240-244).

The process starts in step 500. The process determines if an event 310 has occurred in step 502. If the event 310 has not occurred in step 502, the process repeats step 502. Otherwise, if an event 310 has occurred in step 502, the process goes to step 504. For example, the event 310 in step 502 may be a voice call made on the voice communication system 131 between the communication endpoints 101A and 101B. The process determines, in step 504, if there is a topic ID associated with the event 310. For example, if the user associated a topic with the voice call. If there is not a topic ID associated with the event 310 in step 504, the process goes back to step 502 to wait for another event to occur.

In one embodiment, the topic ID may be associated with an event based on detection of specific words and/or phrases in text or voice information. For example, a user might mention "Project X" in a voice call to trigger the event of step 502.

If there is a topic ID associated with the event 310 in step 504, the process translates the communication information if necessary, in step 506. For example, the process can translate voice to text as defined for the topic ID and the type of event 310. The process then sends the communication information for the topic ID in step 507. The communication information may comprise information, such as, a media stream, time information, user information, caller ID information, user access information, and/or the like. For example, if the event 310 is the voice call between the communication endpoints 101A and 101B, the voice media stream may be converted to text by the voice communication system 131 and sent as a text media stream to the communication collector 122. If the event 310 was a posting on a social media network 135, the posting may be sent to the communication collector 122. If the event 310 is accessing and modifying a document in a document management system 243, the document management system 243 may send the edits to the document in the communication information (e.g., as disclosed in the multimedia event window 330N). If the event 310 is detection of motion by the camera 244, the camera 244 may send an image or video captured by the camera 244 in the communication information. If the event 310 is an email, the communication information can be the body of the email (e.g., as shown in email event window 340A). If the event 310 is an IM communication, the communication information may be the text of the IM communication.

The process determines in step 508 if the event 310 is a voice, video, or IM communication session (e.g., a real-time or near real-time communication session). If the event 310 is not for a voice, video, or IM communication session (where a data is not sent over time) in step 508, the process goes to step 502. Otherwise, if the event 310 is for a voice, video, or IM communication session, (or where a data is sent over time) the process determines, in step 510, if the communication session has ended. If the communication session has ended in step 510, the process goes to step 502. Otherwise, if the communication session has not ended in step 510, the process goes to step 506 to send the next portion of the media stream/data (if there is something to send). This allows a media stream to be viewed in real-time or near-real time from the topic record 124 via the topic window 300.

Figure 6:
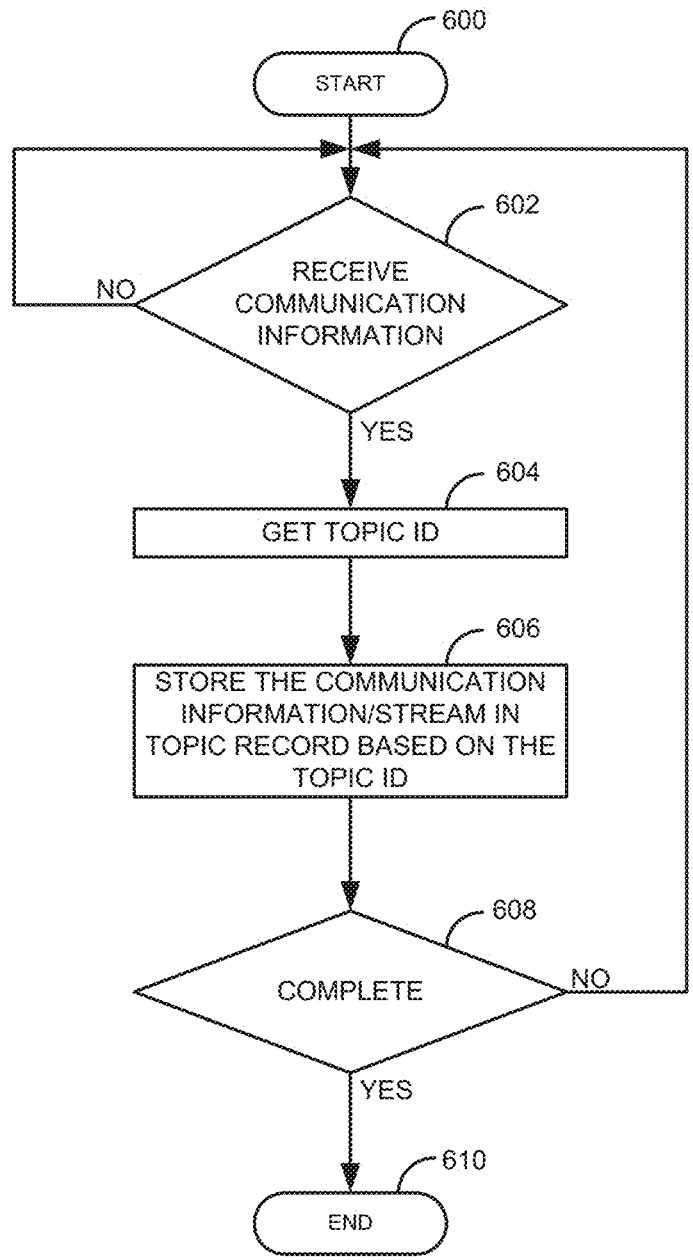
FIG. 6 is a flow diagram of a process for capturing and storing information from communications based on a topic ID.

FIG. 6 is a flow diagram of a process for capturing and storing information from communications based on a topic ID. The process of FIG. 6 is from the perspective of the communication manger 120.

The process starts in step 600. The communication collector 122 waits to receive communication information (sent in step 506) in step 602. Multiple media streams/information may be received at the same time for a topic record 124. For example, if two real-time communication sessions occur at the same time, the communication collector 122 may receive the two media streams simultaneously. If communication information/media stream(s) are not received in step 602, the process repeats step 602.

Otherwise, if communication information is received in step 602, the communication collector 122 gets the topic ID from the communication information in step 604. The communication collector 122 stores the communication information in the topic record 124 based on the topic ID in step 606. The communication collector 122 determines in step 608 if the process is complete. If the process is complete in step 608, the process ends in step 610. Otherwise, the process goes to step 602.

The process of FIGS. 5 and 6 can work where there are multiple topic IDs associated with different segments of a communication session. For example, the communication session may be a multimedia communication session with a plurality of agenda items. Each of the agenda items may have a separate topic ID. For example, agenda item one may discuss Project A and agenda item 2 may discuss project B. As one topic changes to another topic in the multimedia communication session, a different topic ID is associated with the sent communication information in step 506. The communication collector 122 gets the different topic IDs and stores the communication information based on the different topic IDs. Thus, a single communication session may have segments that are included in multiple topic records 124.

In addition, a communication can have multiple topic IDs associated with the same communication. For example, a voice communication or email communication may have two or more topic IDs associated with the communication. A user may be able to select multiple topic IDs to associate with the communication.

The process of FIGS. 5 and 6 can also work for a document. For example, a document may have different sections (e.g., headings). Different sections may have a different topic ID associated within the document. The topic ID is used to store the information from the document (e.g., changes for each section) based the topic ID associated with the section(s).

The process of FIGS. 5 and 6 can work where a communication session (e.g., the initial communication session) is a non-real-time communication session (e.g., an email or text message) that is escalated to a real-time communication session (e.g., a voice or video communication session). For example, a user may click on a web page to escalate a chat on the web page to a voice call. Alternatively, the process of FIGS. 5 and 6 may work where the communication session (e.g., the initial communication session) is a real-time communication session that is deescalated into a non-real-time communication session.

In another embodiment, the initial communication can be a voicemail. The second communication can be an email reply to the voicemail, a forward of the voicemail, a voice call in response to the voicemail, a video call in response to the voicemail, a text message in response to the voicemail, and/or the like. Other examples can be a voice call made in response to a document edit, a voice call made in response to a web page access, an IM session initiated based on a posting to a social media network 135.

Figure 7:
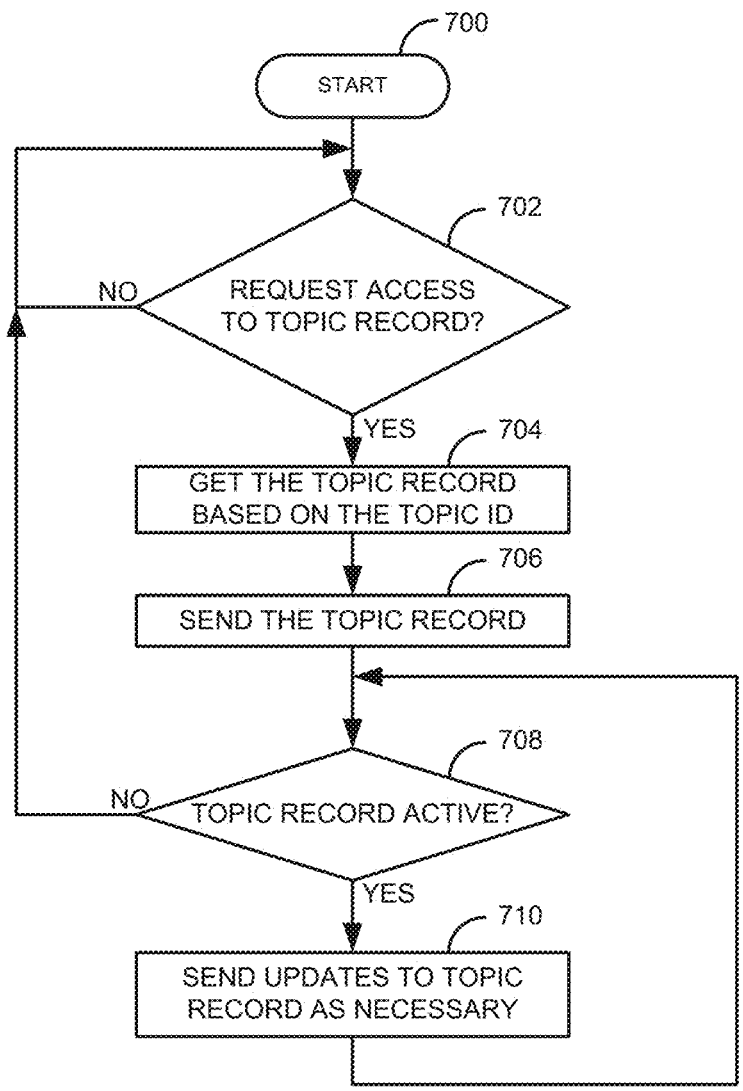
FIG. 7 is a flow diagram of a process for accessing topic records.

FIG. 7 is a flow diagram of a process for accessing topic records 124. The process starts in step 700. The topic manager 123 determines in step 702 if a request to access a topic record 124 has been received. If a request to access a topic record 124 has not been received in step 702, the process repeats step 702. For example, the process of step 702 is a thread that waits to receive a request to access a topic record.

Otherwise, if a request to access a topic is received in step 702, topic manager 123 gets, in step 704, the topic record 124 based on the topic ID, which is part of the request. For example, when a user of a communication endpoint 101 brings up a topic record application (not shown) and requests a topic record 124 by sending the request with the topic ID.

The topic manager 123 sends, in step 706, the topic record 124. The topic manager 123 determines in step 708 if the topic record 124 is still active. An active topic record 124 is where a real-time or near-real-time media stream is being streamed into the topic record 124 (e.g., a voice, video, or IM stream). If the topic record 124 is not active in step 708, the process goes back to step 702. Otherwise, if the topic record 124 is still active in step 708, the topic collector 122 sends, in step 710 updates to the topic record 124 as necessary. The process then goes to step 708.

To illustrate the processes of FIGS. 3-7. Consider the following example. The topic is security of a building. There are two security cameras 244, two card readers with ID sensors 242, and a monitoring facility.

A group of users has been defined that includes two security guards, a monitoring guard (a person monitoring security), and a manager (step 402). The communication systems associated with the group include the cameras 244, the card readers 242, a voice communication system 131, and an email communication system 133 (steps 404 and 406).

Events 310 for the project can be where one of the security cameras 244 detects motion, where there is an attempt to access the building via the card readers 242, voice calls associated with the building, emails associated with the building, and/or the like. A person access the building via one of the card readers 242 (step 502). The card reader 242 sends communication information (e.g., a name of the person and time of access) to the communication collector 122 with the topic ID (steps 504-506). One of the security cameras 244 detects motion (step 502) and starts recording the video stream of the security camera 244. The video stream is sent to communication collector 122 with the topic ID for the project (steps 504-510). The communication collector 122 receives the video stream from the security camera 244 (step 602), gets the topic ID (step 604), and stores the recording from the security camera 244 (step 606). The monitoring guard sees the feed of the video stream from the security camera 244 and makes a voice call to a security guard at a guard shack (step 502-504). The voice communication system 131 sends the media stream of the voice call to the communication collector 122 (steps 506-510). The topic collector 122 receives the media stream of the voice call (steps 602). The communication collector 122 gets the topic ID and stores the voice call based on the topic ID (steps 604-606). The monitoring guard also sends an email to the manager (step 502). The email communication system 133 sends the email with the topic ID to the communication collector 122 (steps 504-506). The communication collector 122 receives the email, gets the topic ID, and stores the email based on the topic ID (steps 602-606). In response to receiving the email, the manager, requests access to the topic record 124 (step 702). The topic manager 123 gets the topic record 124 and sends the topic record 124 to the manager's communication endpoint 101 (steps 704-706). The topic record 124 is then displayed to the manager at the communication endpoint 101 (e.g., in a similar manner as shown in FIG. 3).

Figure 8:
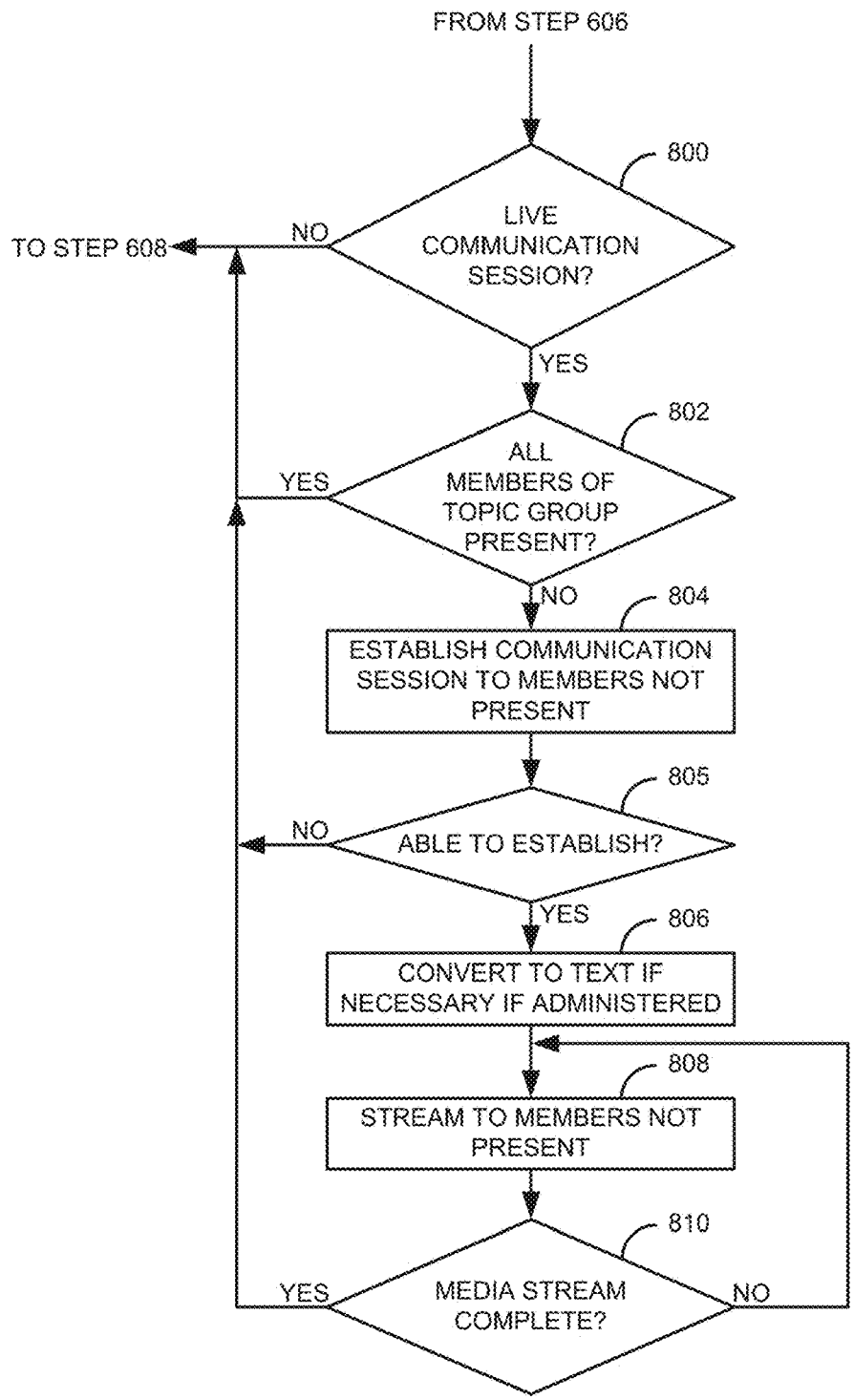
FIG. 8 is a flow diagram of a process for streaming communication information to members of a group that are not present in a communication session.

FIG. 8 is a flow diagram of a process for streaming communication information to members of a group that are not present in a communication session. The process of FIG. 8 is an optional process. The process of FIG. 8 goes between steps 606 and 608 of FIG. 6.

After storing the communication information in the topic record 124 based on the topic ID in step 606, the topic manager 123 determines in step 800 if the communication session is a live communication session, such as a voice, video, or IM communication session. If the communication session is not a live communication session in step 800, the process goes to step 608.

Otherwise, if the communication session is a live communication session in step 800, the topic manager 123 determines if all members of the topic group are present in step 802 (e.g., as defined in step 402). If all members of the topic group are present in step 802, the process goes to step 608. Otherwise, if all members of the topic group are not present in step 802, an attempt is made to establish a communication session to members of the topic group that are not present in step 804. In one embodiment, the members of the topic group that are not present and have a communication session established in step 804 are administered (e.g., a supervisor of a group is the only person administered try and establish a communication session with). If a communication session cannot be established in step 805 (with an individual member of the topic group that is not present), the process goes to step 608 for that particular member.

Otherwise, if the communication session can be established in step 805, the media stream is converted to text if necessary if administered in step 806. For example, a user may administer that a voice stream be converted to text in step 806. Alternatively, the user may just want to listen to the voice communication session and step 806 will not be implemented. The media stream is streamed to the reachable member(s) not present in the media session (or those members who are not present who have been administered to receive the media stream) in step 808.

In one embodiment, members of a group do not have to be online from a real-time perspective. For example, a member of a group may be online using a near real time channel view and therefore will always be reachable. For example, the communication channel may be a slow link with no guarantee of delivery like Short Message Service (SMS) or an inverted communication media pull mechanism like a large buffered asynchronous read.

The process determines if the media stream has ended in step 810. If the media stream has not ended in step 810, the process goes back to step 808. Otherwise, if the media stream has ended in step 810, the process goes to step 608.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the embodiments are considered to include a tangible storage medium or distribution medium and prior art-recognized equivalents and successor media, in which the software implementations of the present embodiments are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element.

The terms "determine", "calculate" and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A method comprising:
    receiving, by a processor, first communication information taken from a first communication in a first communication medium, wherein the first communication information taken from the first communication has an associated first topic identifier, wherein the first communication is a multimedia communication session and wherein the first communication comprises a first document that is edited during the multimedia communication session by a plurality of users;
    receiving, by the processor, edits to the first document during the multimedia communication session, where the edits to the first document are also part of the first communication information taken from the first communication, wherein the first document has a plurality of sections, wherein the first topic identifier is associated with at least a first one of the plurality of sections, wherein the first communication information taken from the first communication comprises the at least first one of the plurality of sections, wherein a second topic identifier is associated with at least a second one of the plurality of sections, and wherein the at least second one of the plurality of sections is grouped with a second communication based on the second topic identifier;
    receiving, by the processor, second communication information taken from the second communication associated with the second topic identifier; and
    storing, by the processor, the first communication information and the second communication information into a first topic record based on the first topic identifier.

2. The method of claim 1, wherein the first communication comprises a plurality of segments, wherein the first topic identifier is associated with at least a first one of the plurality of segments in the first communication, wherein the first communication information taken from the first communication comprises the at least first one of the plurality of segments in the first communication, wherein a third topic identifier is associated with at least a second one of the plurality of segments in the first communication, and wherein the at least second one of the plurality of segments in the first communication is stored in a second topic record based on the third topic identifier.

3. The method of claim 1, wherein the second communication is a voicemail and wherein a third communication is one of an email replay to the voicemail or a forward of the voicemail.

4. The method of claim 1, wherein the second communication is in a non-real-time communication medium and wherein the second communication is escalated to a real-time communication.

5. The method of claim 1, wherein the first communication is deescalated to a non-real-time communication.

6. The method of claim 1, wherein the second communication is a real-time communication session and further comprising: providing, by the processor, the first topic record in real-time.

7. The method of claim 1, further comprising:
    receiving, by the processor, information identifying a group of users associated with the first topic identifier;
    determining, by the processor, one or more communication systems that are used by the group of users; and
    sending, by the processor, the first topic identifier to the communications systems that are used by the group of users.

8. The method of claim 1, wherein the second communication is an audio or video communication and further comprising:
    determining, by the processor, that an individual user from the group of users is not present in the second communication; and
    in response to determining that the individual user from the group of users is not present in the second communication, converting, by the processor, the audio or video communication to text in the second communication information taken from the second communication and automatically streaming the first topic record to the individual user.

9. The method of claim 1, wherein the first communication information is displayed to a user as a transcription of the first communication and wherein the edits to the first document are displayed chronologically in relation to a discussion in the first communication.

10. The method of claim 1, wherein the edits to the first document are accomplished using voice that is then turned into text edits.

11. A system comprising:
a microprocessor, and
a computer readable medium, coupled with the microprocessor and comprising microprocessor readable and executable instructions for a communication collector, wherein the communication collector causes the microprocessor to:
receive first communication information taken from a first communication in a first communication medium, wherein the first communication information taken from the first communication has an associated first topic identifier, wherein the first communication is a multimedia communication session and wherein the first communication comprises a first document that is edited during the multimedia communication session by a plurality of users;
receive edits to the first document during the multimedia communication session, where the edits to the first document are also part of the first communication information taken from the first communication, wherein the first document has a plurality of sections, wherein the first topic identifier is associated with at least a first one of the plurality of sections, wherein the first communication information taken from the first communication comprises the at least first one of the plurality of sections, wherein a second topic identifier is associated with at least a second one of the plurality of sections, and wherein the at least second one of the plurality of sections is grouped with a second communication based on the second topic identifier;
receive second communication information taken from the second communication associated with the second topic identifier; and
store the first communication information and the second communication information into a first topic record based on the first topic identifier.

12. The system of claim 11, wherein the first communication comprises a plurality of segments, wherein the first topic identifier is associated with at least a first one of the plurality of segments in the first communication, wherein the first communication information taken from the first communication comprises the at least first one of the plurality of segments in the first communication, wherein a third topic identifier is associated with at least a second one of the plurality of segments in the first communication, and wherein the at least second one of the plurality of segments in the first communication is stored in a second topic record based on the third topic identifier.

13. The system of claim 11, wherein second communication is a voicemail and wherein a third communication is one of an email replay to the voicemail or a forward of the voicemail.

14. The system of claim 11, wherein the second communication is in a non-real-time communication medium and wherein the second communication is escalated to a real-time communication.

15. The system of claim 11, wherein the first communication is deescalated to a non-real-time communication.

16. The system of claim 11, wherein the second communication is a real-time communication session and further comprising:
a microprocessor readable and executable topic manager that causes the microprocessor to provide the first topic record in real-time.

17. The system of claim 11, further comprising:
a microprocessor readable and executable topic manager that causes the microprocessor to receive information identifying a group of users associated with the first topic identifier; determine one or more communication systems that are used by the group of users; and send the first topic identifier to the communications systems that are used by the group of users.

18. The system of claim 17, wherein the second communication is an audio or video communication and further comprising:
a microprocessor readable and executable topic manager that causes the microprocessor to determine that an individual user from the group of users is not present in the second communication; convert the audio or video communication to text in the second communication information taken from the second communication; and automatically stream the first topic record to the individual user in response to determining that the individual user from the group of users is not present in the second communication.

19. The system of claim 11, wherein the first communication information is displayed to a user as a transcription of the first communication and wherein the edits to the first document are displayed chronologically in relation to a discussion in the first communication.

20. The system of claim 11, wherein the edits to the first document are accomplished using voice that is then turned into text edits.

* * * * *